United States Patent [19]

Chase et al.

[11] B 4,009,317

[45] Feb. 22, 1977

[54] GLASS FIBER COATED WITH A SIZE COMPRISING EMULSIFIED CLAD PARTICLES OF POLY(METHYL METHACRYLATE)

[75] Inventors: Kenneth P. Chase; Harold L. Haynes, both of Newark; Michael G. Roberts, Heath, all of Ohio

[73] Assignee: Owens-Corning Fiberglas Corporation, Toledo, Ohio

[22] Filed: Nov. 14, 1973

[21] Appl. No.: 415,590

[44] Published under the second Trial Voluntary Protest Program on March 23, 1976 as document No. B 415,590.

[52] U.S. Cl. .................. 428/378; 260/17.4 ST; 260/29.6 RB; 260/29.7 UA; 260/879; 260/885; 428/392

[51] Int. Cl.² .................. B32B 17/02; C08L 23/02

[58] Field of Search ............ 117/126 GB, 100 C; 260/29.6 RB, 29.7 UA, 885, 879; 428/378, 392

[56] References Cited

UNITED STATES PATENTS

| | | | |
|---|---|---|---|
| 3,284,179 | 11/1966 | Eilerman | 65/3 |
| 3,329,638 | 4/1967 | Blyth | 260/885 |
| 3,374,289 | 3/1968 | Ott | 260/29.6 RB |
| 3,399,159 | 8/1968 | Samour | 260/29.6 RB |
| 3,489,699 | 1/1970 | Battaerd | 260/885 |
| 3,502,745 | 3/1970 | Minton | 260/29.6 RB |
| 3,599,418 | 8/1971 | Hill | 117/126 GR |
| 3,615,311 | 10/1971 | Ignatius | 65/3 |
| 3,632,535 | 1/1972 | Gravera | 260/29.6 RB |
| 3,655,353 | 4/1972 | Nalley | 117/126 GB |
| 3,657,172 | 4/1972 | Gallagher | 260/29.6 RB |
| 3,661,994 | 5/1972 | Hwa | 260/29.7 OP |
| 3,829,302 | 8/1974 | Hayner | 117/126 GB |

*Primary Examiner*—Ralph Husack
*Assistant Examiner*—William H. Schmidt
*Attorney, Agent, or Firm*—John W. Overman; William P. Hickey

[57] ABSTRACT

A coating composition for glass fibers comprising a film former of emulsified clad particles having a core of poly alkyl methacrylates and that include at least 5% of methyl methacrylate and a cladding of a softer thermoplastic polymeric material having a Tg of 10° C or less. A method of producing such emulsified coated particles is also disclosed, as well as glass fibers coated with such mixtures.

18 Claims, No Drawings

GLASS FIBER COATED WITH A SIZE COMPRISING EMULSIFIED CLAD PARTICLES OF POLY(METHYL METHACRYLATE)

BACKGROUND OF THE INVENTION

In order that glass fibers for use as textiles can be made economically, they must be produced and handled in groups of hundreds or even thousands. As is well known, glass is easily broken when its surface is scratched and the glass is stressed; and it is further known that glass surfaces when rubbed against each other will produce mutual abrasion of the surfaces. Immediately after being formed and before the individual fibers are brought together into a bundle or strand, therefore, the individual glass fibers must be coated with a protective material. Because the bundle or strands of glass fibers must be drawn over numerous guide surfaces at high rates of speed during the twisting, beaming, quilling, and weaving operations that are required of textiles, the sizes or coatings on the fibers must not only prevent mutual abrasion of the individual filaments but they must provide controlled tension to the fibers and be compatible with whatever subsequent treatment the fibers are to be given. No material has ever been found which is ideally suited as a coating material for glass fibers, and which will ideally fulfill all of the requirements and conditions to which the fibers are subjected before they end up as a finished product. The best overall material which the prior art has found has been a combination of starch and lubricants. The lubricants which have been used have been combinations of cationic lubricants which are soluble in the aqueous starch solution, and nonionic lubricants which appear to break up the starch film-forming materials and help in reducing the tensions that are developed when the bundle of fibers are drawn over guide surfaces in their dried condition. Attempts have been made to replace the starch with a synthetic polymeric film former because of the greater uniformity of such materials, but none have been developed to applicants' knowledge which are better than starch. Synthetic polymers generally suffer from the failing of producing too high tensions when the bundles are drawn over the guide surfaces. Starches, on the other hand, are not permanent film formers which can be depended upon to protect the fibers during their ultimate useage, and so the starches must be burned off of the fibers after they have been processed through the weaving operation. The burning process of most starches usually leaves a minor amount of black and objectional residue prior to the time that a finish coating of polymeric material is put onto the fibers as a protective coating for the fibers during their ultimate use. Ideally, a finish material which could also be used as a protective coating during the forming and twisting, quilling, beaming, and weaving operations and which did not have to be removed or replaced has been the ultimate objective of the art, but such a material or composition has not been found.

An object of the present invention is the provision of a new and improved coating material for glass fibers which will provide the desired protection and tension during the forming, twisting, quilling, beaming, and weaving operations, and which can be burned off of the fibers better than the prior art materials.

Another object of the present invention is the provision of a new and improved material of the above described type which not only provides good burn off, but which produces a film on glass fibers having the desirable characteristics of starch.

Another object of the present invention is the provision of a new and improved type of film former for glass fibers and method of making the same, which will allow the film former to be better tailored to the particular processing operations to which the glass fibers are to be subjected.

Further objects and advantages of the invention will become apparent to those skilled in the art to which the invention relates from the following description of the preferred embodiments and the accompanying claims.

DESCRIPTION OF THE PREFERRED EMBODIMENTS

As previously indicated, the prior art has not found a synthetic polymeric material which has both good burn off, and the necessary film forming properties which will give the wet out, separation, desirable low tensions, and low stiffness that is required of such coatings to protect glass fibers during their processing through the weaving operation.

According to the present invention it has been discovered that particles of poly alkyl methacrylate polymer which contains at least about 5% by weight or more of methyl methacrylate and which are coated with other softer polymeric materials preferably having a Tg of 10°C or less, can provide protective coatings that not only have the good burn off that is required for such coatings, but also have the low stiffness, etc. required. These particles will hereafter be called "clad" particles, and can be incorporated with other lubricants to provide a desired range in tension to the coated fibers for processing through the various operations up through weaving.

Specific poly alkyl methacrylates which can be used for the backbone of the core material, other than methyl methacrylate, may include but are not limited to the ethyl, butyl, octyl, decyl, lauryl, isodecyl, and stearyl esters.

According to the invention it has been discovered that clad particles of poly methacrylates as above described have such good burn off properties as to overcome inadequacies in such respect of the cladding material, and of the lubricating materials with which the clad particles are to be used. The clad particles, therefore, provide the formulator of sizes with greater flexibility in his selection of the other materials, such as lubricants, secondary film formers, etc. which he incorporates into the size.

Since the present cladding technique so adequately solves the burn off problem, a great range in outer coating or cladding compositions for the particles can be utilized. Some of the materials which have been found useful as particle coatings or claddings are homopolymers and/or copolymers of butyl acrylate, butyl methacrylate, vinyl acetate, and cationic monomers such as N,N,N trimethyl-aminoethylmethacrylate methyl sulfate, and others too numerous to mention.

A size for glass fibers is made from the following:

EXAMPLE 1

| Ingredients | % By Weight |
| --- | --- |
| Benzylated Starch Granules | 3.300 |
| Paraffin wax | 0.750 |
| Ester type vegetable wax | 0.250 |

| Ingredients | % By Weight |
|---|---|
| Emulsifier for wax (Polyglycol 23-oleyl alcohol condensate) | 0.150 |
| Cationic lubricant (reaction product of tetraethylene pentamine and stearic acid in a molar ratio of 1:2) | 0.230 |
| Emulsion of "clad" particles (50% solids) | 4.120 |
| Plasticizer and humectant (Carbowax 300) | 0.328 |

The starch is prepared by making a slurry at room temperature and heating the slurry to 150°F. Thereafter the slurry is fed to a jet cooker having a dwell time of approximately one half second and an exit temperature of 212°F following which it is quenched to approximately 150° to 160°F to produce both solubilized and swollen but unburst starch granules. The wax is melted at between 180° to 190°F and the wax emulsifier, wax, and cationic lubricant are uniformly mixed. Water at 190°F is added slowly to produce an emulsion and thereafter additional water is added until it inverts, turns white, and thins out. Thereafter the emulsion of clad particles is added, and completely dispersed following which the humectant and plasticizers are added and mixed.

The clad latex was prepared by first producing a latex of poly (methyl methacrylate) particles from the following ingredients:

| Ingredients | Parts By Weight |
|---|---|
| Methyl methacrylate | 960 |
| Emulsifier (oxyethylated octyl phenol 70% solids) | 54.86 |
| Free radical source $(NH_4)_2S_2O_8$ | 2.88 |
| Tertiary Butyl Hydroperoxide | 0.96 |
| Promoter $FeSO_4 \cdot 7H_2O$ (0.50% aqueous solution) | 1.50 |
| Reducing agent $Na_2S_2O_4$ | 1.21 |
| Deionized water | 1978.6 |

The temperature of the mixture rose from room temperature to 69°C peak exotherm after 28 minutes, following which the emulsion was strained and was ready for cladding.

The emulsified particles of poly (methyl methacrylate) produced as above described was then clad with poly (ethyl acrylate) using the following ingredients:

| Ingredients | Parts By Weight |
|---|---|
| Poly (methyl methacrylate) emulsion (32% solids) | 375.0 |
| Ethyl acrylate | 30.0 |
| $(NH_4)_2S_2O_8$ | 0.09 |
| $Na_2S_2O_4$ | 0.04 |
| Oxyethylated octyl phenol (70% solids) | 4.29 |
| Deionized water | 90.6 |

The poly (methyl methacrylate) latex produced as above described plus the persulfate was charged to a reactor and the reactor purged with nitrogen. Thereafter the sodium hydrosulfite reducing agent, and all the ethyl acrylate monomer was added and the reaction began, inasmuch as iron was present from the previously produced poly (methyl methacrylate) emulsion. After the polymerization started, the oxyethylated octyl phenol was slowly added and the reaction completed in approximately one half hour. Thereafter a defoaming agent was added and the material strained to provide the finished clad particle emulsion, the particles of which comprise a poly (methyl methacrylate) surrounded by a cladding layer of poly (ethyl acrylate).

The size produced as above described was applied to 408 E-glass filaments at forming. The filaments have a diameter of 35 to 40 one hundred thousands. The filaments were drawn over an applicator wetted with the size at a temperature of 130°F, and thereafter the filaments were brought together into a strand and wound upon a mandrel into a package. The package was removed and oven dried for 24 hours at 265°F. The strand from the package gave low fuzz, and had acceptable tensions during twisting, quilling, beaming, and weaving, and gave excellent burn off from woven fabric produced therefrom.

EXAMPLE 2

The process of Example 1 was repeated excepting that 2-ethylhexyl acrylate was substituted for the ethyl acrylate in the cladding operation. The strand produced had substantially the same properties as did the strand of Example 1.

The following examples are given of sized fibers which are not oven dried. A size formulation is made of the following materials:

EXAMPLE 3

| Ingredients | % By Weight |
|---|---|
| Pearl starch | 1.92 |
| Benzylated starch (produced as described in application Serial No. 885,599, filed December 16, 1969), Now U.S. Pat. No. 3,664,855 | 2.40 |
| Sperm wax | 1.74 |
| Emulsifier (polyglycol 23-Oleyl alcohol condensate) | 0.17 |
| Cationic lubricant (same as Example 1) | 0.262 |
| Emulsion of poly (2-ethylhexyl acrylate) clad poly (methyl methacrylate) particles of Example 2 | 1.22 |
| Water | Balance |

This material is applied to 408 E-glass filaments at forming at a temperature of 130°F. The filaments had a diameter of 22 to 28 one hundred thousands. The coated strand was formed into a coiled package as above described and then air dried for 48 hours. Inasmuch as the strand was air dried, the clad poly (methyl methacrylate) particles did not flow together and thereby produce an integral polymer phase, but on the other hand, left the polymer particles dispersed throughout the starch. The coated strands had less fuzz and lower tensions during the twisting, quilling, beaming, and weaving operations than did the materials of Examples 1 and 2. The coated woven fabric had as good burn off as did the materials of Examples 1 and 2.

EXAMPLE 4

The process of Example 3 was repeated excepting that the poly (methyl methacrylate) particles were clad with a poly (butyl acrylate). The clad particles were produced using the same procedure as given in Example 1 excepting that butyl acrylate was substituted for the ethyl acrylate monomer in the cladding operation.

The coated fibers of this Example had acceptable levels of tension and gave woven fabric having good burn-off.

EXAMPLE 5

The following example demonstrates that the clad particles of the present invention can be incorporated with other polymeric film formers and still provide good burn-off and acceptable tensions:

| Ingredients | % By Weight |
| --- | --- |
| Pearl starch | 3.300 |
| Benzylated starch same as Example 1) | 1.100 |
| Synthetic ester type wax | 0.750 |
| Paraffin wax | 0.250 |
| Wax emulsifying agent (Polyoxyethylene sorbitan monostearate) | 0.140 |
| Wax emulsifying agent (Sorbitan monostearate) | 0.120 |
| Cationic lubricant (same as Example 1) | 0.189 |
| Latex of Example 4 | 1.00 |
| Poly (ethyl acrylate) emulsion (50% solids) | 1.000 |

Fibers coated and processed with the above material using the procedures of Example 3 had aceptable tension and burn-off.

EXAMPLE 6

The process of Example 3 was repeated excepting that 110 parts by weight of methyl acrylate was substituted for the ethyl acrylate to give clad particles which had approximately a 50 percent by weight of poly (methyl acrylate) cladding. The coated fibers performed satisfactorily throughout the procedures described in Example 3.

EXAMPLE 7

The process of Example 3 was repeated excepting that butadiene was substituted for the 2-ethylhexyl acrylate in the cladding operation, and the process was carried out in a pressure vessel. The coated fibers had acceptable tensions and excellent burn-off.

EXAMPLE 8

The process of Example 7 was repeated excepting that a 50—50 percent mixture of butadiene and styrene was used in the cladding process. This material had acceptable tensions and burn-off.

EXAMPLE 9

The process of Example 3 was repeated excepting that a 50—50 percent mixture of butyl methacrylate and butyl acrylate was used instead of the ethyl acrylate in the cladding process. This material had acceptable tensions and burn-off.

EXAMPLE 10

The process of Example 3 was repeated excepting that lauryl methacrylate was substituted for the 2-ethylhexyl acrylate, and a mixture of 80% water, 20% methanol was substituted for the water to effect complete dissolving of the lauryl methacrylate in the cladding process. The coated fibers had acceptable tensions and burn-off.

EXAMPLE 11

The process of Example 3 was repeated excepting that an 80% vinyl acetate, 20% 2-ethylhexyl acrylate, was substituted for the 2-ethylhexyl acrylate in the cladding process. This material gave excellent tensions, a very low fuzz level, and excellent burn-off. The 2-ethylhexyl acrylate was blended in with the vinyl acetate to produce a copolymer having a Tg of approximately $-2°C$.

EXAMPLE 12

The process of Example 3 was repeated, excepting that N,N,N, trimethyl-aminoethylmethacrylate methyl sulfate was substituted for the 2-ethylhexyl acrylate. The coated fibers had good properties including very low fuzz.

EXAMPLE 13

The process of Example 3 was repeated excepting that the cladding operation was performed using the following materials:

| Ingredients | Parts By Weight |
| --- | --- |
| Poly (methyl methacrylate) latex of Example 1 | 375.0 |
| Vinyl acetate | 30.0 |
| Dibutyl maleate | 50.0 |
| Ammonium persulfate | 0.400 |
| $Na_2S_2O_4$ | 0.200 |
| Oxyethylated octyl phenol | 4.00 |

This material gave excellent tension and burn-off during the twisting, quilling, beaming, and weaving operations described in Example 1.

EXAMPLE 14

The following is an example of a size using the clad particles as the total film former:

| Ingredients | % By Weight |
| --- | --- |
| Emulsified clad particles of Example 3 | 4.0 |
| Paraffin wax | 2.0 |
| Emulsifying agent (Polyoxyethylene sorbitan monostearate) | 0.15 |
| Emulsifying agent (Sorbitan monostearate) | 0.14 |
| Cationic lubricant of Example 1 | 0.20 |
| Carbowax 1500 monostearate | 0.50 |

In general, sizes for glass fibers will have the following ranges of materials on a solids basic:

| Materials | % By Weight |
| --- | --- |
| Emulsified clad particles | 20–70 |
| Other film former | 0–40 |
| Cationic lubricant | 2–5 |
| Humectant | 0–7 |
| Nonionic lubricant (wax, fatty oil, or grease) | 3.0–70 |

The aqueous sizes that are applied to glass fibers will generally comprise:

| Ingredients | Parts or % By Weight |
| --- | --- |
| Emulsified clad particles | 0.5–10 |
| Other film former | 0–9.5 |
| Cationic lubricant | 0.1–2.0 |
| Nonionic lubricant | 0.5–3.0 |
| Humectant | 0–.3 |
| Water | Balance |

The other, or supplemental film formers that may be used with the clad particles of the present invention will include, for example, polyvinyl acetates, acrylics, gelatin, elastomers such as styrene, butadiene, rubber, etc., and starch is a preferred supplemental film former.

While the invention has been described in considerable detail, we do not wish to be limited to the particular embodiments shown and described, and it is our intention to cover hereby all novel adaptations, modifications, and arrangements thereof which come within the practice of those skilled in the art to which the invention relates.

We claim:

1. Glass fibers coated with an aqueous dispersion containing emulsified clad particles of a film former which clad particles have a core that consists of poly alkyl methacrylate and containing at least 5% by weight of methyl methacrylate, and an outer shell of a film forming polymeric material having a Tg of approximately 10°C or less.

2. The glass fibers of claim 1 wherein said poly (methyl methacrylate) comprises at least 50% of the emulsified particles.

3. The glass fibers of claim 1 wherein said outer shell is predominantly poly (vinyl acetate).

4. The glass fibers of claim 1 wherein said outer shell comprises a cationic polymer.

5. The glass fibers of claim 4 wherein said cationic polymer is predominantly poly (N,N,N trimethylaminoethyl methacrylate).

6. The glass fibers of claim 1 wherein said outer shell is predominantly poly (butyl acrylate).

7. The glass fibers of claim 2 wherein said outer shell is predominantly poly (2-ethylhexyl acrylate).

8. Glass fibers having a coating thereon comprising the following solids in approximate percentages by weight:

| | |
| --- | --- |
| Emulsified clad particles having a core consisting solely of a poly alkyl methacrylate material of which at least 5% is methyl methacrylate | 20–70 |
| Additional film former | 0–40 |
| Cationic lubricant | 2–5 |
| Nonionic lubricant | 3–70 |
| Humectant | 0–7 | said clad particles having an outer shell of a film forming polymeric material having a Tg of approximately 10°C or less.

9. The glass fibers of claim 8 wherein said clad particles have a cladding that comprises a poly (vinyl acetate) copolymer.

10. The glass fibers of claim 8 wherein said clad particles have a cladding that comprises poly (2-ethylhexyl acrylate).

11. The glass fibers of claim 8 wherein said clad particles have a cladding that comprises poly (N,N,N trimethylaminoethyl methacrylate).

12. The glass fibers of claim 8 wherein said clad particles have a cladding that comprises poly (butyl acrylate).

13. The glass fibers of claim 8 wherein said clad particles have a cladding that comprises polybutadiene.

14. The glass fibers of claim 8 wherein said clad particles have a cladding that comprises poly (vinyl acetate-codibutyl maleate).

15. The glass fibers of claim 8 wherein said clad particles have a cladding that comprises poly (vinyl acetate-2-ethylhexyl acrylate).

16. The glass fibers of claim 8 wherein said clad particles have a cladding that comprises poly (lauryl methacrylate).

17. The glass fibers of claim 8 wherein said clad particles have a cladding that comprises poly (butyl acrylate).

18. The glass fibers of claim 8 wherein the supplemental film former is starch.

* * * * *